Sept. 20, 1966   L. A. HADDOCK, JR   3,273,416
SPEED AND DIRECTION CONTROL LINKAGE
Filed June 1, 1964                                3 Sheets-Sheet 1

INVENTOR
LOUIS A. HADDOCK JR.
BY
Kenneth C. Witt
ATTORNEY

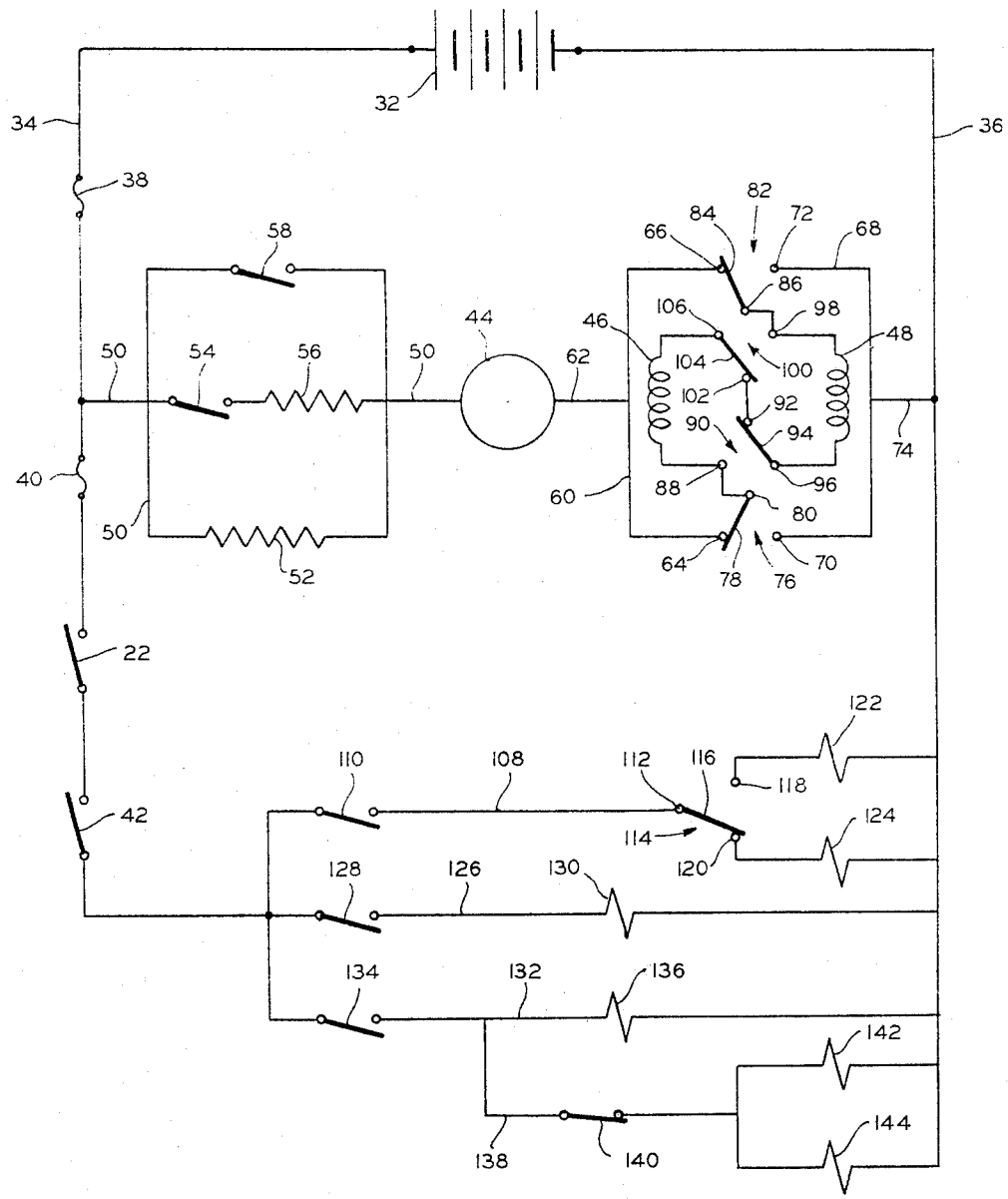

Sept. 20, 1966 L. A. HADDOCK, JR 3,273,416
SPEED AND DIRECTION CONTROL LINKAGE
Filed June 1, 1964 3 Sheets-Sheet 3
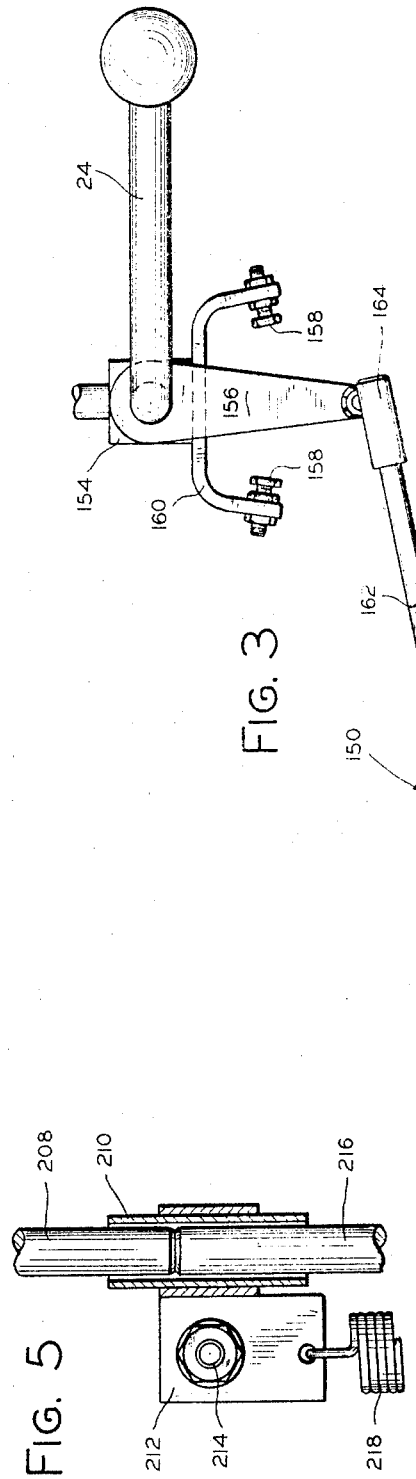
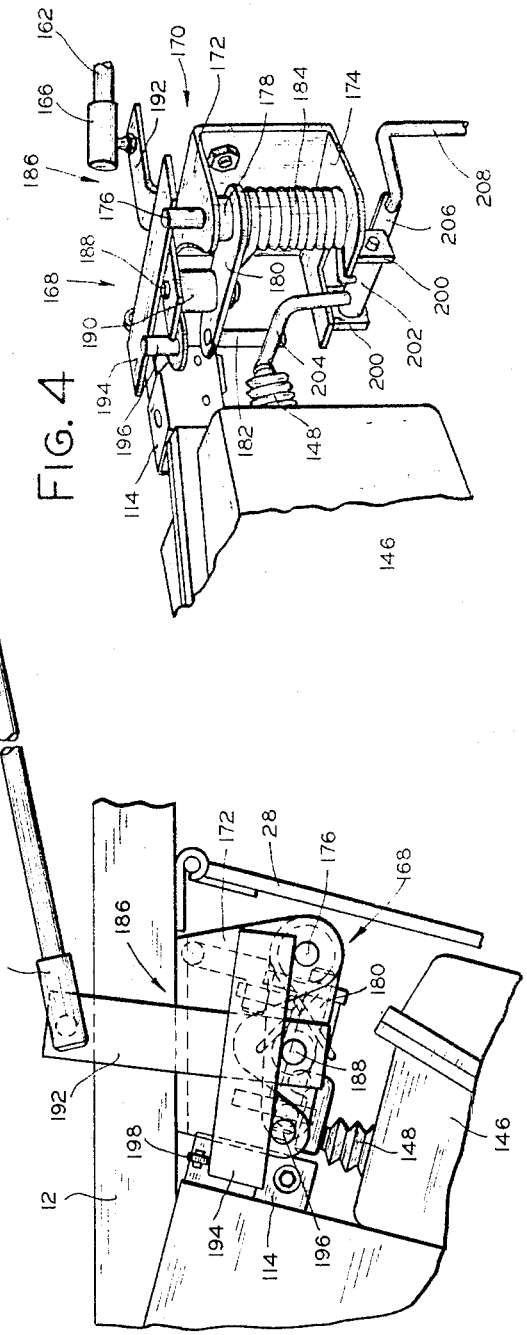
INVENTOR
LOUIS A. HADDOCK JR.
BY
Kenneth C. Witt
ATTORNEY United States Patent Office 3,273,416
Patented Sept. 20, 1966

3,273,416
SPEED AND DIRECTION CONTROL LINKAGE
Louis A. Haddock, Jr., Battle Creek, Mich., assignor to Clark Equipment Company, a corporation of Michigan
Filed June 1, 1964, Ser. No. 371,554
6 Claims. (Cl. 74—471)

This invention relates to vehicle control linkage, and more specifically to linkage for controlling vehicle speed and direction. This linkage is particularly suited for use with an electric motor speed control which is actuated by an outwardly biased plunger, although its usefulness is not limited to such application since, for example, it could be used with a carburetor connected to an internal combustion engine.

In certain types of vehicles, such as industrial lift trucks of the standup rider type, the truck speed and direction of drive usually is controlled by a hand operated lever which is arranged to be actuated forwardly or away from the operator for forward drive and rearwardly or toward the operator for reverse drive, the extent of movement of the lever determining the truck speed. Because the operator control lever is arranged to move in two directions, there is a problem if the motor speed control is of the type which is actuated by an outwardly biased plunger because the linkage connecting the plunger and the control lever must translate bidirectional movement into unidirectional movement.

A principal object of my invention is to provide linkage for translating bidirectional movement into unidirectional movement.

Another object of my invention is to provide control linkage suitable for use with a motor speed control actuated by an outwardly biased plunger.

In carrying out my invention in a preferred embodiment thereof, there is provided a spring biased mechanism for translating bidirectional movement into a unidirectional movement which is located adjacent the plunger of a master speed control, the plunger being spring biased to extend. The mechanism includes a pin disposed to actuate the plunger, an actuating member operably connected to the pin so that movement of the actuating member in either of two directions causes the pin to move in only a single direction away from the plunger and spring means for biasing the pin toward the plunger with sufficient force to overcome the outward bias of the plunger. The actuating member is disposed so that movement of it in one of the two directions actuates the direction control switch. An operator's control member is operatively connected to the actuating member for moving the actuating member in either of the two directions.

The above and other objects, features and advantages of my invention will become more easily understood when the following detailed description is taken in conjunction with the accompanying drawing wherein:

FIGURE 2 is a partial wiring diagram for the lift truck shown in FIG. 1,

FIGURE 3 is a plan view of my linkage;

FIGURE 4 is a perspective view showing in detail the mechanism for translating bidirectional movement into unidirectional movement; and FIGURE 5 is an enlarged view showing in detail a part of the linkage for coordinating the truck speed with the brake.

Figure 1:
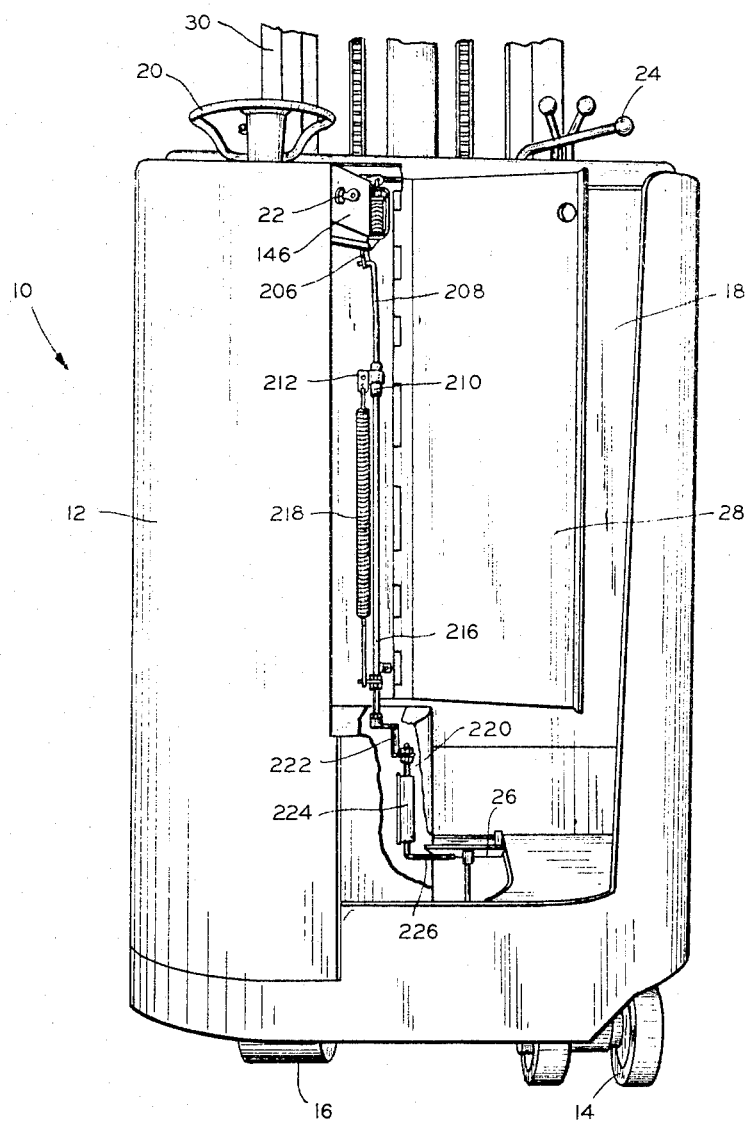
FIGURE 1 shows a rear elevation of an industrial lift truck with which my invention is used, one of the cover panels of the lift truck being opened to show part of the linkage.

Referring to FIG. 1, there is shown an electric industrial lift truck 10 of the stand-up rider type. Lift truck 10 will be described briefly in order to provide an environment with which to facilitate an understanding of my invention which is disclosed as embodied in such a lift truck. Lift truck 10 includes a body portion 12 which is supported at the rear end thereof by a dual caster wheel 14 and a drive steer wheel 16 which is powered by an electric drive motor. Body 12 also includes an operator's station 18 which provides a place for an operator to stand. Located adjacent to operator's station 18 are various controls including a steering control wheel 20, a key operated on-off switch 22, a speed and direction hand control lever 24 and a foot operated brake control pedal 26. Also, a cover plate 28 is shown in an opened position in order to expose a portion of our control linkage. Attached to the front end of lift truck 10 is a lift upright 30, only a portion of which is shown. Lift upright 30 is provided with load engaging means (not shown) for picking up and transporting a load or stacking it.

Referring now to FIG. 2, the power circuit for lift truck 10 will be explained. Carried in a recess (not shown) in body 12 forwardly of operator's station 18 is a heavy duty 24 volt battery 32 to which a pair of conductors 34 and 36 are connected to opposite terminals thereof. Disposed in the power circuit portion of conductor 34 is a fuse 38 which, for example, may have a 300 ampere rating and disposed in the control circuit portion of conductor 34 is a fuse which, for example, may have a 30 ampere rating. Also disposed in conductor 34 is key operated on-off switch 22 and switch 42 which is connected to the brake for the lift truck so that when the brake is applied switch 42 is open and when the brake is released switch 42 is closed.

Connected between conductors 34 and 36 is an electric drive motor having an armature 44 and a pair of field windings 46 and 48. One side of armature 44 is connected to conductor 34 by means of a conductor 50 in which a resistance 52 is disposed. Connected in parallel with this circuit is a switch 54 and a resistance 56 connected in parallel and a switch 58 which is in parallel with resistances 52 and 56. The other side of armature 44 is connected to a conductor 60 by means of a conductor 62. Conductor 60 is connected at one end to a switch contact 64 and at the other end to a switch contact 66. Similarly, a conductor 68 is connected at one end to a switch contact 70 and at the other end to a switch contact 72 and conected to conductor 36 by means of a conductor 74. Contacts 64 and 70 make up a part of a relay actuated reverse switch 76 which includes a contactor 78 and a terminal 80. Similarly, contacts 66 and 72 make up a portion of a relay actuated forward switch 82 which includes a contactor 84 and a terminal 86. Terminal 80 is connected to a switch contact 88 of a series parallel switch 90 which includes another contact 92, a contactor 94 and a terminal 96. Similarly, terminal 86 of forward switch 82 is connected to a contact 98 of a series parallel switch 100 which includes another contact 102, a contactor 104 and a terminal 106. It will be noted that field winding 46 is connected between terminal 88 of switch 76 and contact 106 of switch 100 while field winding 48 is connected between terminal 98 of switch 82 and contact 96 of switch 90.

In addition to the power circuit which has just been described there is a control circuit disposed between conductors 34 and 36 and which will be described next. Connected to conductor 34 at one end is a conductor 108 in which a switch 110 is disposed. The other end of conductor 108 is connected to the terminal 112 of a double throw switch 114 which functions as the direction control switch as will be seen shortly. Switch 114 includes a contactor 116 and a pair of contacts 118 and 120. Contactor 116 normally is disposed so that terminal 112 is connected to contact 120. Connected at one end to contact 118 and at the other end to conductor 36 is a relay coil 122 which, when energized, serves to actuate contactor 84 of forward switch 82 from the position shown in FIG. 2 to a position which connects terminal 86 with contact 72. Also, connected between contact 120 and conductor 36 is a relay coil 124 which, when energized, serves to actuate contactor 78 of reverse switch 76 so that terminal 80 is connected with contact 70. Thus, if, for example, relay coil 122 is energized so that switch 82 is actuated to connect terminal 86 with contact 72 while terminal 80 remains connected with contact 64 of switch 76, current can flow through field windings 46 and 48 in one direction which provides for forward operation of the motor. By the same token, if direction control switch 14 is actuated so that terminal 112 is connected to terminal 120, then relay coil 124 can be energized, whereby switch 76 will be actuated to connect terminal 80 and contact 70. At the same time switch 82 will remain disposed, as shown in FIG. 2. Under this condition current can flow through field windings 46 and 48 in a direction opposite to that just described above so that the motor will operate in a reverse direction.

Also connected between conductors 34 and 36 is a conductor 126 in which a switch 128 and a relay coil 130 are disposed in series. Similarly, a conductor 132 is connected between conductors 34 and 36 and includes a switch 134 and a relay coil 136 connected in series. It will be noted that switches 110, 128 and 134 are all disposed in parallel relation. Relay coil 130 serves to actuate switch 54 to close and relay coil 136 serves to actuate switch 58 to close.

Connected to conductor 132 between switch 134 and relay coil 136 is a conductor 138 in which a switch 140 is disposed. The end of conductor 138 opposite conductor 132 is connected to a pair of relay coils 142 and 144 which are connected in parallel at the other ends to conductor 136.

Switches 110, 128, 134 and 140 form a part of and are disposed in a motor speed control or master accelerating switch 146. These switches are connected to a plunger 148 (see FIGS. 3 and 4) so that they will be actuated in a particular sequence by movement of plunger 148 which is spring biased to extend outwardly of control 146. The connection of switches 110, 128, 134 and 140 to plunger 148 is such that when plunger 148 is in its innermost position switch 140 is closed and switches 110, 128 and 134 are open. As plunger 148 is allowed to extend outwardly switch 110 closes. Further extension of plunger 148 causes switch 140 to open and switch 128 to close, switch 110 remaining closed in the meantime. Still further outward movement of plunger 148 causes switch 134 to close. Yet further extension causes switch 140 to close, all of the other switches remaining closed. Speed control 146 is available commercially, for example, from the Square D Company as their master accelerating switch, type No. BD-14.

Assuming that switches 22 and 42 are closed, extension of plunger 148 from its innermost position will serve to energize the drive motor in the following manner. Initial extension of plunger 148 causes switch 110 to close, switch 140 being already closed when plunger 148 is in its innermost position. When switch 110 closes and switch 114 is disposed as shown in FIG. 2, relay coil 124 is energized which causes reverse switch 76 to be actuated so that terminal 80 and contact 70 are connected with the result that current will flow through armature 44 and field windings 46 and 48 to provide a reverse direction drive at a predetermined low or first speed. As plunger 148 is allowed to extend further outwardly switch 140 is actuated to open and switch 128 is closed. As a result relay coil 130 is energized and actuates switch 54 to close, thus placing resistance 56 in parallel with resistance 52 so that the total resistance between conductor 34 and armature 44 is cut in half, thereby increasing the speed of the drive motor to a second speed. Upon further extension of plunger 148 switch 134 is actuated to close with the result that relay coil 136 is energized which in turn actuates switch 58 to close so that resistances 52 and 56 are by-passed, thereby providing a relatively higher or third speed. Finally, further extension of plunger 148 causes switch 140 to again close, thereby energizing relay coils 142 and 144 which in turn actuate switches 90 and 100, respectively, so that terminal 96 is connected to contact 88 and terminal 106 is connected to contact 98, the result being that field windings 46 and 48 are reconnected in parallel which provides a further speed increase for the drive motor. From the foregoing it will be seen that extension of plunger 148 from in its innermost position to its outermost position causes the drive motor to accelerate through four speeds which may be either in a forward or reverse direction, depending upon the position of switch 114.

Plunger 148 and direction control switch 114 are actuated by means of a speed and direction control linkage 150 (FIGS. 1 and 3-5). Linkage 150 includes an operator's control lever or handle 24 pivotally mounted in a block 154 which is fixed to the vehicle frame in any suitable manner. Fixed to lever 24 and extending at right angles therefrom is a crank arm 156. The movement of crank arm 156 is limited by a pair of adjustable stops 158 which are attached to a generally U-shaped bracket 160 which is secured to block 154. Thus, lever 24 and crank arm 156 may move in either direction from the position shown in FIG. 3 within the limits defined by stops 158.

A connecting rod 162 is connected at one end thereof to the outer end of crank arm 156 by means of a swivel joint 164 and is connected at the other end thereof by means of another swivel joint 166 to a mechanism 168 which translates the movement of crank arm 156 in either direction away from the centered position shown in FIG. 3 into movement in a single direction for controlling the extension of plunger 148, as will be explained in more detail hereinbelow.

Mechanism 168 includes a U-shaped support member 170 having an upper leg 172 and a lower leg 174. Support member 170 is fixed to a portion of body 12, as shown in FIG. 3. Pivotally journaled between legs 172 and 174 by means of a pin member 176 which extends above leg 172 is a rod 178 to which a radially extending arm 180 is secured. Secured to arm 180 adjacent the outer end thereof and extending downwardly is a pin 182 which serves to actuate plunger 148 as will be explained in more detail hereinafter. Arm 180 and pin 182 are biased to pivot in a counterclockwise direction, as viewed from above in FIGS. 2 and 3, by means of a coil spring 184 which has one end hooked over the edge of leg 174 and the other end hooked over an edge of arm 180, as shown, in FIG. 3.

A generally T-shaped actuating member 186 is pivotally connected to arm 180 intermediate rod 178 and pin 182 by means of a pin 188 and disposed above leg portion 172 by means of a spacer member 190. T-shaped member 186 includes a stem member 192 and a cross bar 194 fixed to it. Stem member 192 is connected adjacent one end thereof to pin 188 and is connected adjacent the other end thereof to connecting rod 162 by means of swivel joint 166. One edge of cross bar 194 is held in abutment with pin 176 and a pin 196 which is fixed to leg portion 172 and extends upwardly therefrom, pins 176 and 196 being disposed so that pin 188 is located intermediate them.

Direction control switch 114 is fixed to a portion of body 12 adjacent one end of cross bar 194, as shown in FIGS. 3 and 4. Switch 114 includes an actuator member 198 which is disposed to abut the edge of cross bar 194 which is opposite the edge that abuts pins 176 and 196. Under certain conditions of operation, as will be explained in more detail hereinafter, cross bar 194 depresses actuator member 198, thereby connecting terminal 112 (FIG. 2) with contact 118 of switch 114.

Pivotally connected between a pair of tabs 200 which extend downwardly from leg 174 is a bell crank 202 which includes an L-shaped rod or arm member 204 that is disposed between plunger 148 and pin 182 and an arm member 206. Pivotally connected to the outer end of arm member 206 is a downwardly depending rod 208, the lower end of which is slidably telescoped in a sleeve 210 which is supported by a bracket 212 that is connected to truck body 12 by means of a fastener 214. Also slidably telescoped in sleeve 210 is a rod 216 to which a tension spring 218 is secured, tension spring 218 also being secured to bracket 212 so that rod 216 is biased upwardly, as shown in FIG. 1. The bottom end of rod 216 is connected to an L-shaped rod 220 by means of a rigid connecting member 222. Rod is slidably disposed in a guide tube 224 which is attached to a portion of body 12. Further, rod 220 includes a leg portion 226 which extends beneath brake pedal 26 and is adapted to be engaged by it and moved downwardly when brake pedal 26 is depressed.

I will now explain the operation of my invention as used in conjunction with lift truck 10. First, an operator occupies the operator's station 18 and actuates on-off switch 22 to close. Now, when the operator is ready to drive truck 10 forwardly, for example, he will depress brake pedal 26 which causes the truck brake to release, release of the brake actuating switch 42 to close. Depression of brake pedal 26 also causes rod 216 to move downwardly against the bias of spring 218, whereby the end of rod 216 is moved away from the adjacent end of rod 208. With the truck brakes released, the truck is now prepared to be driven. Thus, the operator may actuate lever 24 forwardly or in a counterclockwise direction, as viewed in FIG. 3, so that the end of T-shaped member 186 attached to connecting rod 162 is moved toward the right. This causes T-shaped member 186 to pivot about pin 176 in a clockwise direction with the result that pin 182 pivots in a clockwise direction also. Since the top end of rod 216 has been moved away from the bottom end of rod 208, as explained earlier, the L-shaped arm 204 of bell crank 202 is free to pivot, whereby clockwise movement of pin 182 permits plunger 148 to extend outwardly from control member 146. However, before plunger 148 is permitted to extend far enough to close switch 110 the forward edge of cross bar 194 depresses actuator 198 and causes direction control switch 114 to be actuated so that terminal 112 is connected to contact 118 (FIG. 2) in order to condition the control circuit for forward motor drive. Thus, movement of control lever 24 in a counterclockwise direction serves first to actuate switch 114 to condition the control circuit for forward drive, in the meantime permitting plunger 148 to extend which then actuates switches 110, 128, 134 and 140 in the proper sequence to provide for four increasing motor speeds.

Assuming now that the operator is holding handle 24 as far in the counterclockwise direction as will be permitted by stop 158, the lift truck 10 will be traveling forwardly in its fourth or highest speed. Further, assuming that the operator wishes to apply the truck brakes in this situation, he merely raises his foot off brake pedal 26 which applies the brake and causes switch 42 to open. As a result, rod 216 is moved upwardly by spring 218 into abutment with rod 208. Rods 208 and 216 then move upwardly together under the bias of spring 218 with the result that bell crank 202 is pivoted so that arm 204 is actuated to push plunger 148 back into control 146. Consequently, the switches are returned to the neutral or no drive position shown in FIG. 2. At this point it will be noted that the position of handle 24 remains unaffected by application of the truck brake which, through rods 208 and 216 and bell crank 202, serves to return plunger 148 to the no drive position. Now, if the operator releases the truck brakes by again depressing brake pedal 26, the rod 216 is moved downwardly, thereby permitting rod 208 to move downwardly and allowing bell crank 202 to pivot in a clockwise direction, as viewed from the right in FIG. 4, whereby plunger 148 may again extend with the result that truck 10 again accelerates through the four speeds, as described hereinabove, without the operator having to return control lever 24 to the centered position shown in FIG. 3.

Should the operator desire to drive lift truck 10 in a reverse direction, assuming that brake pedal 26 is depressed and on-off switch 22 is closed, he will actuate control lever 24 in a clockwise direction, as viewed in FIG. 3, which results in connecting rod 162 pushing on the end of T-shaped member 186 to which it is connected. Thus, T-shaped member 186 is caused to pivot in a counterclockwise direction, as viewed in FIG. 3, about pin 196 which causes arm 180 and pin 182 to pivot in a clockwise direction about pin 176 and permits plunger 148 to extend in the same manner as described hereinabove for forward truck movement. Also, it will be noted that counterclockwise movement of T-shaped member 186 about pin 196 does not depress actuator member 198. Therefore, direction control switch 114 remains disposed to energize the control circuit for reverse drive, as shown in FIG. 2. Again, the truck brake may be applied while control lever 24 is disposed in any reverse drive position without effecting the position of control lever 24 or requiring it to be returned to its neutral or centered position before the drive control can be re-energized.

The above detailed description is intended to be exemplary only since my invention is subject to various modifications and changes which would nonetheless fall within the scope of it. Consequently, the limits of my invention should be determined from the following appended claims when taken in conjunction with the prior art.

I claim:

1. For use with a vehicle having a motor speed control which is actuated by an outwardly biased plunger and a direction control switch, speed and direction control linkage comprising a mechanism for changing bidirectional movement to unidirectional movement, the said mechanism including pin means disposed to operatively engage the plunger, an actuating member operatively connected to the said pin means, pivot means for said actuator so that movement of the said actuating member in either of two directions causes the said pin means to move in only a single direction away from operative engagement with the plunger and spring means for biasing the said pin means into operative engagement with the plunger with sufficient force to overcome the outward bias of the plunger, the said actuating member being disposed so that movement of the said actuating member in one of the said two directions actuates the direction control switch, and an operator's control member operatively connected to the said actuating member for moving the said actuating member in either of the said two directions.

2. For use with a vehicle having a motor speed control which is actuated by an outwardly biased plunger and a direction control switch, speed and direction control linkage comprising a mechanism for translating bidirectional movement into unidirectional movement, the said mechanism including a support, an arm pivotally connected to the said support and disposed to operatively engage the plunger, a pair of spaced-apart stops connected to the said support, a generally T-shaped member having a stem and a cross bar, the said stem being pivotally connected to the said arm intermediate the said stops, the said cross bar being disposed so that the said stops are between the said cross bar and the plunger and one edge of the said cross bar abuts the said stops, and spring means connected to the said arm and the said support for biasing the said cross bar into abutment with the said stops and to operatively engage the plunger with sufficient force to overcome the outward bias of the plunger, an operator's control lever pivotally connected to the vehicle, and linkage connecting the said member and the said lever so that pivotal movement of the said lever in either of two directions causes a similar movement of the said member, the said member being disposed so that movement of the said member in one direction actuates the said direction control switch.

3. A mechanism for translating bidirectional movement into unidirectional movement comprising a support, an arm pivotally connected to the said support, an engaging member connected to said arm and spaced from the pivotal connection of the said arm to the said support, a pair of spaced-apart stops connected to the said support, a T-shaped actuating member having a stem and a cross bar, the said stem being connected to the said arm intermediate the said first-mentioned pivotal connection and the said engaging member for pivotal movement about an axis substantially parallel to the axis of the said first-mentioned pivotal connection, the said cross bar being disposed so that one edge of it abuts the said stops, and means for biasing the said cross bar into abutment with the said stops.

4. A mechanism for translating bidirectional movement into unidirectional movement comprising a support, an arm connected to the said support for pivotal movement about a first axis, a pair of spaced-apart stops connected to the said support, a T-shaped actuating member with a stem and a cross bar, the said stem being connected to the said arm intermediate the said stops for pivotal movement about an axis substantially parallel with the said first axis, and means connected between the said arm and support for biasing one edge of the said cross bar into abutment with the said stops.

5. A mechanism for translating bidirectional movement into unidirectional movement comprising a support, an arm pivotally connected to the said support, a pair of spaced-apart stops connected to the said support, a generally T-shaped member having a stem and a cross bar, said stem being pivotally connected to the said arm intermediate the said stops, and means for biasing one edge of the said cross bar into abutment with the said stops.

6. A mechanism for translating bidirectional movement into unidirectional movement comprising a generally U-shaped support having first and second legs, a rod journaled between the said legs for pivotal movement about a first axis, a substantially radially extending arm fixed to the said rod, a pair of spaced-apart stops connected to one of the legs, a generally T-shaped actuator having a stem and a cross bar, the said stem being connected to the said arm intermediate the said stops for pivotal movement about an axis substantially parallel to the said first axis, the said cross bar being disposed so that one edge of it abuts the said stops, and a coil spring carried by the said rod and connected to the said arm and the said support so as to bias the said one edge of the said cross bar into abutment with the said stops.

No references cited.

MILTON KAUFMAN, *Primary Examiner.*